Dec. 26, 1967   A. SCHECHTER   3,360,150
PACKING OR SUPPORTING TRAY
Filed March 22, 1963   2 Sheets-Sheet 1

INVENTOR.
ALFRED SCHECHTER
BY
ATTORNEYS

Dec. 26, 1967          A. SCHECHTER          3,360,150
PACKING OR SUPPORTING TRAY
Filed March 22, 1963                    2 Sheets-Sheet 2

INVENTOR.
ALFRED SCHECHTER
BY
ATTORNEYS

United States Patent Office 3,360,150
Patented Dec. 26, 1967

3,360,150
PACKING OR SUPPORTING TRAY
Alfred Schechter, New Rochelle, N.Y., assignor to Phillips Petroleum Company, a corporation of Delaware
Filed Mar. 22, 1963, Ser. No. 267,121
2 Claims. (Cl. 217—26.5)

This invention relates to a packing or supporting tray. In one aspect this invention relates to an egg supporting tray adapted to support eggs in the pockets thereof with minimum contact between the eggs and the tray.

It is common practice to wash, grade and otherwise process eggs in large numbers. Eggs are relatively fragile articles and care must be exercised in the collecting, processing, and other handling in order to avoid damaging or breaking the eggs. Various kinds of baskets, trays, crates, and other means have been provided for facilitating such handling. These prior art devices possess various defects. For example, in the washing of eggs the tray or other supporting device should organize or arrange the eggs in such a manner as to provide efficient circulation of the washing liquid around the eggs. Many prior art devices do not do this.

After being washed, the eggs are drained and dried. It is important that the drainage and drying be as complete as possible so as to eliminate possible bacteria infestation. Many prior art devices do not provide adequate drainage. Some supporting devices of the prior art provide such large areas of contact between the egg and the supporting device that water is held on the eggs, by capillary attraction at said areas of contact, for such a long period of time that water spots develop on the shell of the egg even when the ultimate drainage is adequate.

Furthermore, some trays and other supporting devices are seriously inadequate with respect to their primary purpose, i.e., providing adequate support for the egg. Consequently, in handling, both prior and subsequent to washing as in grading and packing, unduly large numbers of eggs are cracked or broken.

The present invention provides an egg supporting tray which eliminates the above-described difficulties. The egg suporting tray of the invention provides a predetermined number of egg receiving pockets so formed and arranged as to provide maximum circulation of washing fluid around the egg during the washing step, maximum drainage after the washing step, and maximum circulation of air around the washed egg for drying and subsequent cooling. The egg supporting tray of the invention provides a firm support for said eggs with a minimum of contact between the eggs and the tray with resultant elimination of water spotting. Furthermore, when using the egg supporting trays of the invention, handling of the eggs is minimized and the number of broken or cracked eggs is greatly reduced.

An object of this invention is to provide an improved packing or supporting tray for fragile articles, such as eggs. Another object of this invention is to provide a firm but somewhat resilient support in a packing or supporting tray for fragile articles, such as eggs, with a minimum number of points of contact between said articles and said supporting tray. Another object of this invention is to provide an egg supporting tray which provides maximum circulation of washing fluid around the eggs during the washing thereof and maximum drainage of the eggs after said washing step. Still another object of this invention is to provide an egg supporting tray which provides maximum air circulation around the supported eggs for rapid cooling thereof subsequent to the washing step and in other cooling operations, such as in storage. Still another object of this invention is to provide an egg supporting tray wherein the egg receiving pockets therein are arranged in an orderly and efficient manner so as to provide maximum utilization of space, both in the tray itself and in crates wherein the filled trays are packed. Other aspects, objects, and advantages of the invention will be apparent to those skilled in the art in view of this disclosure.

Figure 1:
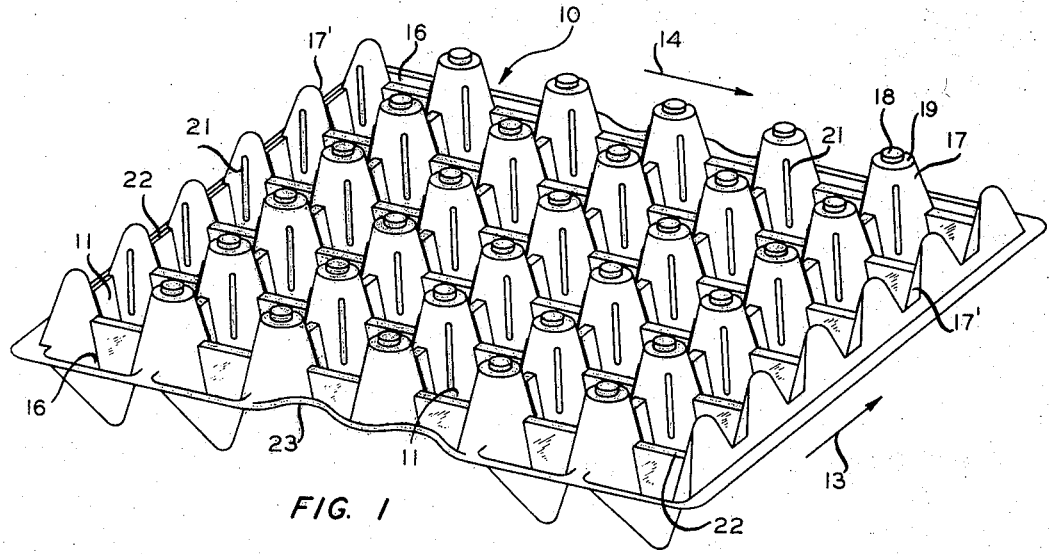
FIGURE 1 is a perspective view illustrating one embodiment of an egg supporting tray in accordance with the invention.

Referring now to the drawings, wherein like reference numerals are employed to denote like parts of the various egg trays, the invention will be more fully described. In the embodiment of the invention illustrated in FIGURES 1 and 2, there is shown an egg suporting tray, designated generally by the reference numeral 10, which comprises a sheet of stiff material provided with a generally rectangular periphery. Said tray is provided with a plurality of cavities 11 formed in said sheet, each of which cavities extends downward below the plane of said sheet. As shown in FIGURE 2, each of said cavities 11 is provided with a drainage hole 12 in the bottom thereof. Said cavities are arranged in six substantially parallel rows running in the direction of the arrow 13 and five substantially parallel columns transverse to said rows, running in the direction of the arrow 14. The first, second, fifth, and sixth rows of said cavities each begin with and end with a half-cavity 16 which also extends below the plane of said sheet. Said tray is also provided with a plurality of hollow tapered posts, such as 17, which each extend upward above the plane of said sheet and downward below the plane of said sheet to define a portion of the wall of the cavities 11 which are adjacent thereto. It will be noted that four of said posts are spaced equidistantly about each of said cavities 11, and each said cavity and the four posts which are adjacent thereto form an egg receiving pocket.

Said tapered posts are arranged in seven substantially parallel rows running in the direction of the arrow 13 and are also arranged in six substantially parallel columns running in the direction of the arrow 14, transverse to said rows. The first and seventh rows of said tapered posts are half-posts, such as 17', which are positioned along opposite peripheral sides of said sheet. Said half-posts 17', which also are hollow, are tapered on the one side only which faces the cavity adjacent thereto. However, said half-posts are tapered within the meaning of the generic term "tapered posts" as used herein and in the claims, unless otherwise specified.

All of said tapered posts, except said tapered half-posts 17', terminate at their upper ends in a knob 18 which has a transverse area smaller than the area in said openings 12 in the bottoms of said cavities 11. Said knobs 18 are each surrounded by a shoulder 19 which together with said knob 18 has a transverse area larger than said openings 12. While said half-posts 17' are not provided with a knob 18 and shoulder 19, it will be noted that at least two of the posts 17 which are spaced about each of the cavities 11 terminate with a knob 18 and shoulder 19.

An elongated ridge 21 projects from the surface of each of said posts 17 and half-posts 17' which faces an adjacent cavity 11 and extends along said surface from a point near the top of the posts downward into said cavity 11. Said ridges 21, together with their positions on the posts 17 and 17', provide one of the outstanding advantages of the invention. When an egg is placed in the egg receiving pocket formed by a cavity 11 and the four tapered posts adjacent thereto, said egg rests on the ridges 21 which are on each of said four posts. Thus, four of said ridges 21 support the egg in said egg receiving pocket. There is thus provided what is essentially only four-point contact between the egg and the tray, said four-point contact providing the minimum practical region of contact. With such a minimum region of contact there is a minimum region for water to be retained at the points of contact, and water spotting is essentially completely eliminated.

A plurality of ribs 22 are formed in said sheet with the tops thereof substantially in the plane of said sheet. Each of said ribs 22 extends downwardly below the plane of the sheet between a pair of the tapered posts to define another portion of the wall of the cavities 11 which are adjacent thereto. Said ribs are preferably tapered, i.e., they are wider at the bottom than at the top.

Figure 2:
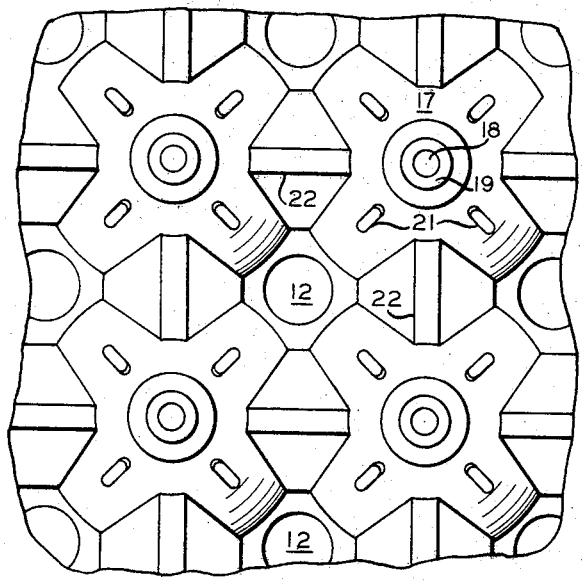
FIGURE 2 is an enlarged plan view of a portion of the egg supporting tray illustrated in FIGURE 1.
Figure 3:
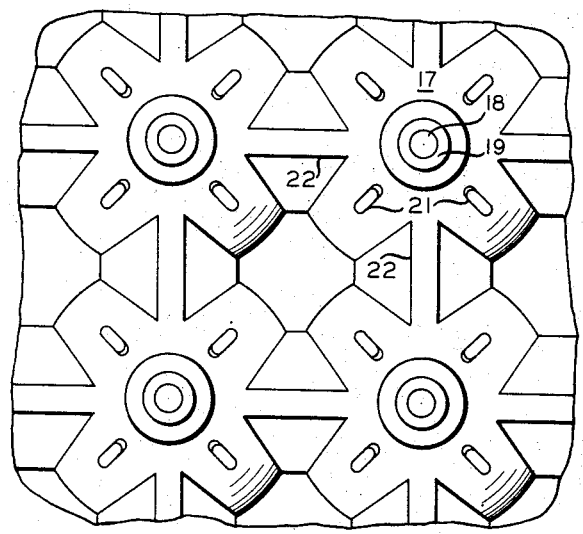
FIGURE 3 is an enlarged plan view of a portion of another embodiment of an egg supporting tray in accordance with the invention.

The embodiment of the invention illustrated in FIGURE 3 is like that illustrated in FIGURES 1 and 2 except that no drainage holes 12 have been provided in the bottoms of the cavities 11. In large produce houses where thousands of eggs are handled daily, there is inevitably some cracking and breakage of the handled eggs. Cracked eggs, of course, cannot be sold in regular commerce for future use and are customarily shipped to dehydrating or other processing plants for immediate use. Some of the cracked eggs develop leaks and are referred to as leaking eggs. When such leaking eggs are packed and shipped in the trays of the prior art the leakage soils or contaminates the egg in the tray below. It is desirable to eliminate or minimize this contamination. The embodiment of the invention illustrated in FIGURE 3 solves this problem by providing a tray wherein the cavities 11 are provided with a continuous or closed bottom so as to contain the leakage. Said continuous or closed bottom is preferably concave in the general shape of the end of an egg.

Figure 4:
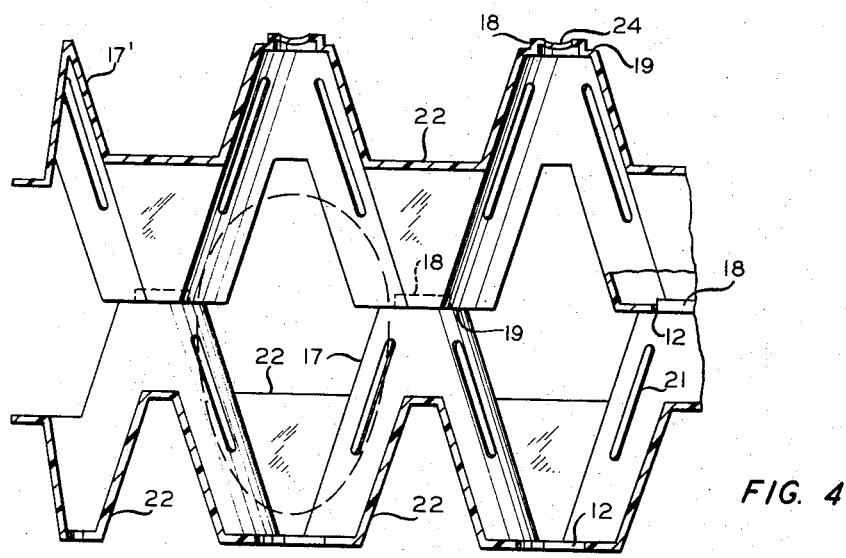
FIGURE 4 is an enlarged cross-sectional view of a portion of two egg supporting trays of the invention, as illustrated in FIGURE 1, in stacked or assembled relationship.

In employing the egg supporting trays of the invention it is preferred, but not essential, that the knobs 18 on the tapered posts 17 register with and extend into the drainage holes 12 of the tray above when the trays are stacked, so as to provide maximum support for the stacked trays. FIGURE 4 illustrates this relationship between an upper and a lower tray. When said trays are stacked as illustrated in FIGURE 4, the upper tray is rotated 90 degrees with respect to the lower tray thus bringing the knobs 18 on the five posts 17 in each column of said posts on the lower tray into register with the five drainage holes in each row of cavities 11 in the upper tray. Thus, the upper ends of the eggs are positioned within the hollow downward facing interior of the posts 17 on the upper tray, and the lower ends of the eggs are positioned in the egg receiving pocket formed by a cavity 11 and the four tapered posts adjacent thereto in the lower tray, and are supported by the ridges 21 on said four tapered posts. The dotted line in FIGURE 4 indicates an egg thus positioned and supported.

As indicated above, it is not essential that the knobs 18 of the tapered posts 17 on the lower tray register with and extend into the drainage holes 12 of the upper tray when the trays are stacked. For example, in the embodiment of the invention illustrated in FIGURE 3 no drainage holes 12 are provided. In employing this type of the egg supporting tray of the invention, the trays when stacked are rotated 90 degrees with respect to each other, as described above, and the bottoms of the cavities of the upper tray rest on or are positioned over the knobs 18 on the lower tray. With this type of tray the upper ends of the eggs themselves, by extending into the hollow downward facing interior of the posts 17 on the tray above (similarly as in FIGURE 4), will serve to position the stacked trays without the help of knobs 18 and openings 12.

Each tray is formed to receive and hold a definite number of eggs, for example 30, and the periphery or rim of the tray can be formed with cut-out portions 23 on two sides thereof. Said cut-out portions serve as finger openings, allowing each tray to be grasped at its edges for convenient handling thereof. When the trays are stacked with said knobs 18 registering with and extending into said openings 12 as described above, the rims or periphery of the trays are in vertical alignment.

Figure 5:
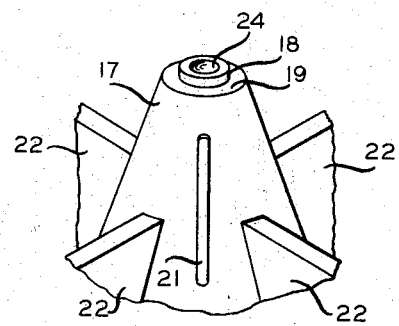
FIGURE 5 is a partial perspective view illustrating a modification of the embodiment of the invention shown in FIGURE 1.

FIGURE 5 illustrates a presently preferred embodiment of the invention wherein the knobs 18 on posts 17 are provided with a concave surface. In shipping eggs, it is customary to always place the eggs in the shipping container with the more narrow end resting downward. Ordinarily, when using the trays of the invention, the eggs will rest in the egg receiving pockets with said more narrow ends thereof positioned well above drainage holes 12. However, some eggs, relatively few compared to the total number of eggs, are long and skinny. In such instances, some of the long and skinny eggs may rest so low in the egg receiving pocket as to possibly contact knob 18 of the tray below. Even though said long and skinny eggs are relatively few in number, it is desirable to provide the maximum protection against breakage of the egg due to said egg contacting knob 18 and thus being deprived of the firm but resilient support afforded by ridges 23 of the egg receiving pocket. The concave surface 24 provides this protection and minimizes the chances of egg breakage. Said concave surface forms a recess to position and support the egg and also tends to be more resilient than a flat surface.

It is common practice in the egg industry to grade eggs into "small," "medium," and "large" grades of eggs. For economic reasons and convenience it is preferred to fabricate the egg supporting trays of the invention in one size which will accommodate all grades of eggs, for example, as illustrated in FIGURE 4. However, it is within the scope of the invention to provide trays especially sized and adapted for each grade of eggs.

The egg supporting trays of the invention can be employed by the poultry man or egg farmer in collecting eggs from the laying house. When so employed the trays can be conveniently stacked within any suitable basket or carrier designed to receive the trays and it is not necessary to count the number of eggs collected because each tray is formed to handle a definite number of eggs and the number of trays arranged in a basket or carrier will indicate the number of eggs collected. The filled trays can be shipped in the collecting basket or carrier, or can be transferred to crates for shipment to an egg processing plant. At said processing plant the eggs are customarily washed. This is preferably done by placing the individual trays on a perforated belt and passing same through an in-line washer wherein the eggs are contacted with the washing fluid. Upon emerging from the washer the eggs are blown dry by means of streams of air directed onto same from both the top and the bottom. The eggs are then ready for grading, candling, or other processing, and packing into crates for shipment or other disposition.

While the supporting trays of the invention have been illustrated as being generally rectangular in shape, it is within the scope of the invention to provide trays having any other suitable shape, such as circular or elliptical. Rectangular-shaped trays are preferred because they provide the most efficient utilization of space, both within the tray itself and in the handling of said trays, such as stacking in crates, etc. Also, it will be understood that the illustrated rectangular trays of the invention are not limited to the above-described number of rows and columns of cavities and tapered posts.

The supporting trays of the invention can be fabricated from any suitable material. Said trays are preferably formed of a stiff or substantially rigid plastic material which, while stiff or rigid enough to prevent sagging or displacement of the trays during use, possesses sufficient resiliency to afford some "give" to the eggs at the points of contact (ridges 23) between the eggs and the tray. A presently preferred material for fabricating said trays are sheets of the normally solid polymers of 1-olefins, e.g., polyethylene, prepared by the process described in U.S. Patent 2,825,721, issued to J. P. Hogan et al., Mar. 4, 1958. The egg supporting trays can be fabricated from said plastic materials by any suitable means, such as vacuum forming, blow molding, etc., known to the art. While said plastic materials are preferred, the trays of the invention can also be fabricated from aluminum or other thin sheet metal, plastic coated paperboard, etc.

"Eggs," as referred to herein, refers generally to the ordinary chicken or food eggs of commerce and the trays of the invention are ordinarily fabricated and the receiving pockets thereof sized to accommodate such eggs because that is the present greatest utility of the invention. It is, however, within the scope of the invention to fabricate and size the trays to accommodate eggs of other sizes and kinds. Also, it is not intended that the invention be limited to use or size as a packing or supporting tray for eggs. The trays of the invention can also be employed as packing or supporting trays for other fragile articles which can be advantageously packed in the receiving pockets of the tray and advantageously supported by the above-described ridges 21 on the tapered posts 17 and 17'.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. An egg supporting and washing tray comprising: a sheet of stiff material; a plurality of cavities formed in said sheet, each of said cavities extending downward below the plane of said sheet; an opening provided in the bottom of each cavity; a plurality of tapered posts, four spaced about each of said cavities, extending upward above the plane of said sheet and downward below said plane of said sheet to define a portion of the wall of the said cavities which are adjacent thereto, each said cavity and the four posts adjacent thereto forming an egg receiving pocket; at least two of said posts spaced about each of said cavities terminating at their upper ends in a knob having a transverse area smaller than the area in said openings in the bottoms of said cavities and surrounded by a shoulder having a transverse area larger than said openings; and an elongated ridge starting above the plane of said sheet and projecting from the surface of each of said posts which faces one of said pockets and extending downward along said surface from a point near the top of the post into said cavity.

2. An egg supporting and washing tray comprising: a sheet of stiff material; a plurality of cavities formed in said sheet, each of said cavities extending downward below the plane of said sheet; an opening provided in the bottom of each cavity; a plurality of tapered posts, four spaced about each of said cavities, extending upward above the plane of said sheet and downward below said plane of said sheet to define a portion of the wall of the said cavities which are adjacent thereto, each said cavity and the four posts adjacent thereto forming an egg receiving pocket; at least two of said posts spaced about each of said cavities terminating at their upper ends in a knob provided with a concave surface, said knob having a transverse area smaller than the area of said openings in the bottoms of said cavities and surrounded by a shoulder having a transverse area larger than said openings; and an elongated ridge starting above the plane of said sheet and projecting from the surface of each of said posts which faces one of said pockets and extending downward along said surface from a point near the top of said posts into said cavity.

References Cited

UNITED STATES PATENTS

| | | | |
|---|---|---|---|
| 1,956,955 | 5/1934 | Kronenberger | 217—26.5 |
| 2,600,130 | 6/1952 | Schilling | 229—2.5 |
| 2,885,136 | 5/1959 | Grant | 217—26.5 |
| 2,950,726 | 8/1960 | Kuhl et al. | 217—26.5 |
| 2,997,196 | 8/1961 | Emery | 217—26.5 |

RAPHAEL H. SCHWARTZ, *Primary Examiner.*